US011331631B1

(12) United States Patent
Bhattacharyya et al.

(10) Patent No.: US 11,331,631 B1
(45) Date of Patent: *May 17, 2022

(54) BORON-CONTAINING POROUS MEMBRANES AND METHODS OF USE THEREOF

(71) Applicant: 1s1 Energy, Inc., Portola Valley, CA (US)

(72) Inventors: Sukanta Bhattacharyya, Belmont, CA (US); Daniel Sobek, Portola Valley, CA (US)

(73) Assignee: 1s1 Energy, Inc., Portola Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/464,420

(22) Filed: Sep. 1, 2021

Related U.S. Application Data

(63) Continuation of application No. PCT/US2021/029705, filed on Apr. 28, 2021.

(60) Provisional application No. 63/109,943, filed on Nov. 5, 2020.

(51) Int. Cl.
| | |
|---|---|
| *B01D 67/00* | (2006.01) |
| *H01M 50/46* | (2021.01) |
| *H01M 50/491* | (2021.01) |
| *H01M 8/10* | (2016.01) |
| *B01D 71/82* | (2006.01) |
| *H01M 50/414* | (2021.01) |
| *H01M 8/1004* | (2016.01) |

(52) U.S. Cl.
CPC ......... *B01D 67/0093* (2013.01); *B01D 71/82* (2013.01); *H01M 8/1004* (2013.01); *H01M 50/414* (2021.01); *H01M 50/46* (2021.01); *H01M 50/491* (2021.01); *B01D 2323/28* (2013.01); *B01D 2323/36* (2013.01); *B01D 2325/02* (2013.01); *B01D 2325/42* (2013.01)

(58) Field of Classification Search
CPC ........ B01D 67/0093; B01D 71/82; B01D 2325/42; B01D 2325/02; B01D 2323/28; B01D 2323/36; H01M 50/46; H01M 50/491; H01M 50/414; H01M 8/1004
USPC .......................................................... 521/27
See application file for complete search history.

(56) References Cited

U.S. PATENT DOCUMENTS

| | | | | |
|---|---|---|---|---|
| 2006/0008692 | A1* | 1/2006 | Sawa | C08F 8/34 429/492 |
| 2006/0027789 | A1 | 2/2006 | Ivanov | |
| 2011/0223518 | A1* | 9/2011 | Hirakimoto | C08J 5/2275 429/492 |
| 2012/0045704 | A1 | 2/2012 | Choudhury | |
| 2018/0375157 | A1 | 12/2018 | Garsuch | |
| 2020/0295394 | A1* | 9/2020 | Al-Sheikhly | H01M 8/1072 |
| 2021/0159530 | A1 | 5/2021 | Epshteyn | |

FOREIGN PATENT DOCUMENTS

| | | |
|---|---|---|
| CN | 102924720 | 2/2013 |
| KR | 20180089525 | 8/2018 |

OTHER PUBLICATIONS

Du et al. "Ionic Covalent Organic Frameworks with Spiroborate Linkage", Communications, Angew. Chem. Int. Ed. 2016, vol. 55, pp. 1737-1741,www.angewandte.org. (Year: 2016).*
Suzuki et al. "Proton Conducting Borosiloxane Solid Electrolytes and Their Composites with Nation", FuelCells, 2002, 2, No. 1, pp. 46-51. (Year: 2002).*
Higuchi et al. "Gas diffusion electrodes for polymer electrolyte fuel cells using borosiloxane electrolytes", Solid Stateionic, 171 (2004), pp. 45-49. (Year: 2004).*
"International Search Report and Written Opinion dated Jul. 21, 2021 in corresponding International Application No. PCT/US21/29705 with International Filing Date of Apr. 28, 2021."
Du, et al., "Ionic Covalent Organic Frameworks with Spiroborate Linkage", Angewandte Chemie, vol. 55, Dec. 23, 2015, p. 1737-1741.
Higuchi, et al., "Gas diffusion electrodes for polymer electrolyte fuel cells using borosiloxane electrolytes", Solid State Ionics, vol. 171, Jun. 30, 2004, p. 45-49.
Kalaj, et al., "MOF-Polymer Hybrid Materials: From Simple Composites to Tailored Architectures", Chem Rev. Aug. 26, 2020; 120 (16):8267-8302. doi: 10.1021/acs.chemrev.9b00575. Epub Jan. 2, 2020. PMID: 31895556.
Suzuki, et al., "Proton Conducting Borosiloxane Solid Electrolytes and Their Composites with Nafion", Fuel Cells, vol. 2, Sep. 24, 2002, p. 46-51.
Wikipedia, et al., "Fullerene", Nov. 1, 2020, p. 4 (retrieved Jul. 30, 2021) from website https://en.wikipedia.org/w/index.php?title=Fulleren&oldid=986547935.
Ford, et al., "Molecular Complexes of Boron Trifluoride With Some Formyl Compounds, HCOX (X=H, CH3, NH2, OH, F): Effect of Substitution, and Extension to X=Li, BeH, and BH2", South African Journal of Chemistry. 2018; abstract; p. 141, col. 1, second paragraph.

(Continued)

*Primary Examiner* — Michael M. Bernshteyn
(74) *Attorney, Agent, or Firm* — ALG Intellectual Property, LLC (57) ABSTRACT

A proton exchange membrane includes a porous structural framework and a boron-based acid group bonded to the porous structural framework. The porous structural framework may be formed of an amorphous or crystalline inorganic material and/or a synthetic or natural polymer. The boron-based acid group may be a tetravalent boric acid derivative, such as a cyclic boric acid derivative, borospiranic acid, or a borospiranic acid derivative. The boron-based acid group may be the reaction product of boric acid or a boric acid derivative and a poly-hydroxy compound.

20 Claims, 11 Drawing Sheets

(56) References Cited

OTHER PUBLICATIONS

Mamlouk, et al., A boron phosphate-phosphoric acid composite membrane for medium temperature proton exchange membrane fuel cells, Journal of Power Sources. Jul. 2015; title; abstract; p. 291, col. 2, first-third paragraphs.

Wen, et al., Sulfonated poly(ether sulfone) (SPES)/boron phosphate (BPO4) composite membranes for high-temperature proton-exchange membrane fuel cells, International Journal of Hydrogen Energy. 2009; abstract; p. 8984, col. 2, first paragraph; p. 8989 col. 1, first paragraph.

* cited by examiner

BORON-CONTAINING POROUS MEMBRANES AND METHODS OF USE THEREOF

RELATED APPLICATIONS

The present application is a continuation of International Patent Application No. PCT/US2021/029705, filed Apr. 28, 2021, which claims priority to U.S. Provisional Patent Application No. 63/109,943, filed Nov. 5, 2020, the contents of which are hereby incorporated by reference in their entireties.

BACKGROUND INFORMATION

Proton exchange membranes (PEMs) are semipermeable membranes that are engineered to transport protons ($H^+$) while being impermeable to gases such as hydrogen ($H_2$) and oxygen ($O_2$). PEMs may be used in hydrogen fuel cells and water electrolysis systems under acidic conditions. PEMs may be composed of a mechanically and chemically resistant porous framework with highly acidic functional groups. For example, Nafion-based proton exchange membranes contain a polytetrafluoroethylene (PTFE) porous structural framework with sulfonic acid groups. The easily dissociable sulfonic acid groups serve as proton transport agents in the membrane.

SUMMARY

The following description presents a simplified summary of one or more aspects of the methods and systems described herein in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects of the methods and systems described herein in a simplified form as a prelude to the more detailed description that is presented below.

In some illustrative embodiments, a proton exchange membrane comprises a porous structural framework and a boron-based acid group bonded to the porous structural framework.

In some illustrative embodiments, the boron-based acid group comprises a cyclic boric acid derivative.

In some illustrative embodiments, the boron-based acid group comprises borospiranic acid.

In some illustrative embodiments, the boron-based acid group comprises a catechol derivative.

In some illustrative embodiments, the porous structural framework comprises solid support particles linked by the boron-based acid group.

In some illustrative embodiments, the porous structural framework comprises a porous polymer network, and the boron-based acid group is bonded to pore surfaces of the polymer network.

In some illustrative embodiments, the porous structural framework comprises an inorganic material.

In some illustrative embodiments, a method of making a proton exchange membrane comprises bonding a boron-based acid group to a pore surface included in a porous structural framework.

In some illustrative embodiments, the bonding comprises reacting boric acid or a boric acid derivative with hydroxyl groups present at the pore surface.

In some illustrative embodiments, the bonding comprises reacting a poly-hydroxy compound with a boric acid derivative bonded to the pore surface.

In some illustrative embodiments, the method further comprises coupling a nanoparticle to the pore surface by way of the boron-based acid group.

In some illustrative embodiments, a membrane electrode assembly comprises a cathode, an anode, and a proton exchange membrane positioned between the cathode and the anode, the proton exchange membrane comprising a porous structural framework and boron-based acid groups bonded to pore surfaces in the porous structural framework.

In some illustrative embodiments, at least one of the anode or the cathode comprises a catalyst and an ionomer for binding the catalyst, and the ionomer comprises a boron-based acid group.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Boron-containing porous membranes, and methods of making and using boron-containing porous membranes, are described herein. In some examples, a boron-containing porous membrane includes a porous structural framework and a boron-based acid group covalently bonded to the porous structural framework. The porous structural framework may be formed of an amorphous or crystalline inorganic material and/or a synthetic or natural polymer. The boron-based acid group may be a boric acid derivative, such as a cyclic boric acid derivative, borospiranic acid, or a borospiranic acid derivative. In some examples, the boron-based acid group is the reaction product of boric acid or a boric acid derivative and a poly-hydroxy compound. In some examples, the boron-based acid group comprises a tetravalent boron-based acid group.

The boron-containing porous membranes described herein may be used as PEMs for water electrolysis and/or fuel cell applications operating under acidic conditions. In the boron-containing PEMs described herein, cation (e.g., proton) exchange is provided by protons ionically linked to the tetravalent, negatively charged boron atoms. The presence of the oxygen-boron bonds increases the hydrophilicity of the porous structural framework and stabilizes the negatively charged boron atoms. The boron-containing PEMs described herein also have high mechanical strength, high proton conductivity, low electron conductivity, chemical stability under a large pH gradient, durability, and low cost of production. The boron-containing porous membranes may be produced from boric acid and its precursors (such as borax), which are naturally abundant and inexpensive. In some examples, the boron-containing porous membranes described herein also do not incorporate toxic materials.

The boron-containing porous membranes described herein may also be used for filtering and/or neutralizing pathogens such as bacteria, viruses, and fungal spores. For example, the boron-containing porous membranes may be implemented in face masks, surgical masks, air filters, and air purification systems for enclosed spaces (e.g., homes, offices, hospitals, factories, vehicles, airplanes, etc.).

The apparatuses, compositions, and methods described herein may provide one or more of the benefits mentioned above and/or various additional and/or alternative benefits that will be made apparent herein. Various embodiments will now be described in more detail with reference to the figures. It will be understood that the following embodiments are merely illustrative and are not limiting, as various modifications may be made within the scope of the present disclosure.

Figure 1:
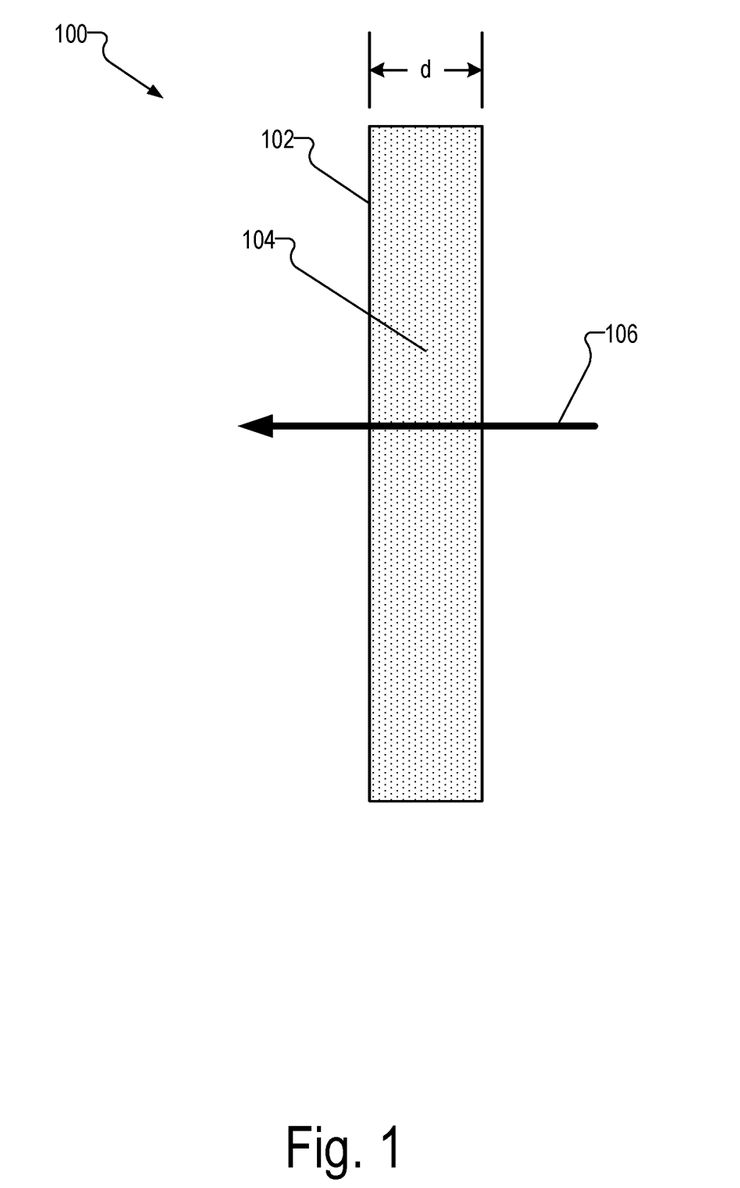
FIG. 1 shows an illustrative proton exchange membrane including a porous structural framework and boron-based acid groups bonded to pore surfaces of the porous structural framework.

FIG. 1 shows an illustrative proton exchange membrane 100 (PEM 100). PEM 100 includes a porous structural framework 102 having pores and boron-based acid groups 104 distributed throughout porous structural framework 102 and bonded to pore surfaces of porous structural framework 102.

Porous structural framework 102 may be formed of any suitable material or combination of materials, including inorganic materials and/or organic materials. Suitable inorganic materials may include amorphous inorganic materials (e.g., glass, fused silica, or ceramics) and/or crystalline inorganic materials (e.g., quartz, single crystal silicon, or alumina). Suitable organic material may include, for example, synthetic and/or natural polymers (e.g., cellulose).

PEM 100 may have a thickness d ranging from a few microns to hundreds of microns. With the configurations described herein, PEM 100 may withstand pressure differentials of up to 30 atmospheres and acidic pH gradients across the membrane. PEM 100 may also be permeable to water and protons, which may be conducted through PEM 100 as indicated by arrow 106, but PEM 100 is generally impermeable to gases including hydrogen and oxygen.

Figure 2A:
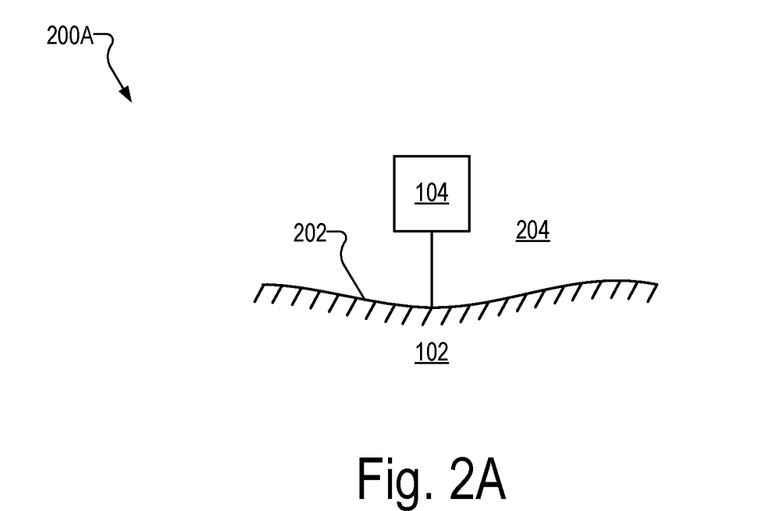
FIG. 2A shows an illustrative configuration of the porous structural framework and boron-based acid groups within the PEM of FIG. 1.
Figure 2B:
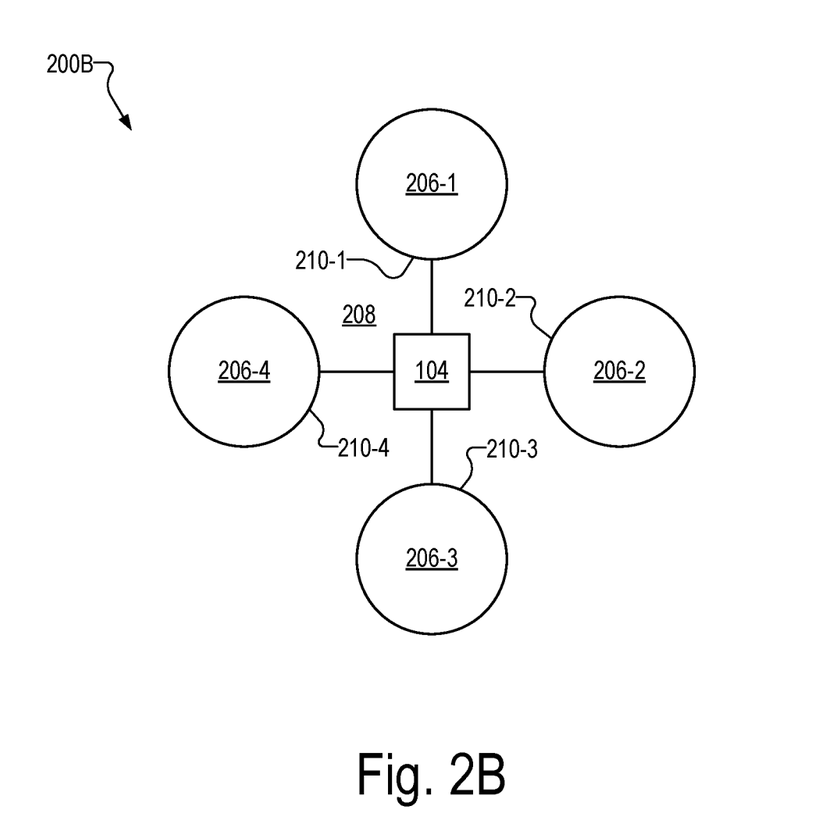
FIG. 2B shows another illustrative configuration of the porous structural framework and boron-based acid groups within the PEM of FIG. 1.

Boron-based acid groups 104 may be bonded to pore surfaces within PEM 100 in at least two different configurations, as shown in FIGS. 2A and 2B. FIGS. 2A and 2B show illustrative configurations of porous structural framework 102 and boron-based acid groups 104 within PEM 100. It will be recognized that each of FIGS. 2A and 2B shows only a portion of PEM 100 and is representative of features throughout PEM 100.

In a first illustrative configuration 200A shown in FIG. 2A, a pore surface 202 adjacent to a pore 204 is functionalized with a boron-based acid group 104 such that boron-based acid group 104 is bonded to pore surface 202. While FIG. 2A shows only one boron-based acid group 104 bonded to pore surface 202, porous structural framework 102 may have any number and concentration of boron-based acid groups 104 bonded to pore surface 202.

In a second illustrative configuration 200B shown in FIG. 2B, porous structural framework 102 comprises solid support particles 206 (e.g., solid support particles 206-1 to 206-4) linked together by boron-based acid group 104. The linked solid support particles 206 form a pore 208 in the space between solid support particles 206. Boron-based acid group 104 is bonded to pore surfaces 210 (e.g., pore surfaces 210-1 to 210-4 of solid support particles 206-1 to 206-4). While FIG. 2B shows that four solid support particles 206 are linked by way of boron-based acid group 104, any other number of solid support particles 206 may be linked by way of boron-based acid group 104. Additionally, each solid support particle 206 may be linked to one or more additional solid support particles by way of one or more additional boron-based acid groups, thereby creating porous structural framework 102 with boron-based acid groups 104 bonded to pore surfaces 210 within porous structural framework 102.

Solid support particles 206 may be formed of any suitable material, such as any material described above for porous structural framework 102, such as inorganic molecules (e.g., fused silica particles, ceramic particles, etc.) or organic molecules (e.g., polymers). Solid support particles 206 may have any suitable shape and size, ranging from tens of nanometers (nm) to one hundred microns. The porosity of PEM 100 may be controlled and defined by the size of solid support particles 206. Solid support particles 206 may also be selected for their mechanical strength, their durability in an environment with a high pH gradient, and/or for their affinity to water (e.g., they may be chosen to be hydrophilic or hydrophobic depending on the water-affinity balance desired for PEM 100).

In some examples, boron-based acid groups 104 comprise a boric acid derivative (e.g., a compound or group derived from boric acid). Boric acid has a molecular formula $B(OH)_3$ and the following structure given by formula (I):

(I)

A boric acid derivative may be any compound or group in which one, two, or all three hydroxyl (OH) groups of boric acid have been reacted and combined with one or more other compounds. Electrically neutral boron has three valence electrons but can also form a tetravalent ion with a negative formal charge by covalently bonding with four other atoms. Thus, a boric acid derivative may be trivalent or tetravalent. Illustrative boric acid derivatives will be described below in more detail.

A boric acid derivative may be formed in any suitable way. In some examples, a boric acid derivative is formed by the reaction of boric acid or another boric acid derivative with one or two hydroxyl groups of one or more other compounds. For example, boric acid or a boric acid derivative may react with a poly-hydroxy compound having at least two cis-vicinal hydroxyl groups. The boric acid derivative may include any suitable boric acid derivative, including without limitation a cyclic boric acid derivative, borospiranic acid, a borospiranic acid derivative, and any other boric acid derivative described herein. The poly-hydroxy compound may be any suitable poly-hydroxy compound, such as a polyol, a sugar, a sugar alcohol (e.g., glycerol, mannitol, or sorbitol), catechol, or a derivative of any of the foregoing. In some examples, the poly-hydroxy compound has a structure represented by the following formula (IIa) or (IIb):

in which W, X, Y, and Z are pendant moieties and may each be independently selected from the group consisting of hydrogen (H), a hydroxyl group (OH), a fluoro group (F), a chloro group (Cl), a dialkylamino group ($NR_2$), a cyano group (CN), a carboxylic acid (COOH), a carboxylic amide, a carboxylic ester, an alkyl group, an alkoxy group, and an aryl group. In some examples, any one or more of groups W, X, Y, and Z may represent a $C_1$ to $C_{30}$ alkyl chain that may optionally include one or more substituents, such as oxygen (O), a hydroxyl group (OH), a fluoro group (F), a chloro group (Cl), a dialkylamino group ($NR_2$), a cyano group (CN), a carboxylic acid (COOH), a carboxylic amide, a carboxylic ester, an alkyl group, an alkoxy group, and an aryl group.

Illustrative reaction schemes for making a boric acid derivative by reaction of boric acid or a boric acid derivative with a poly-hydroxy compound will now be shown and described with reference to FIGS. 3A and 3B. It will be recognized that the following reaction schemes are merely illustrative and are not limiting.

Figure 3A:
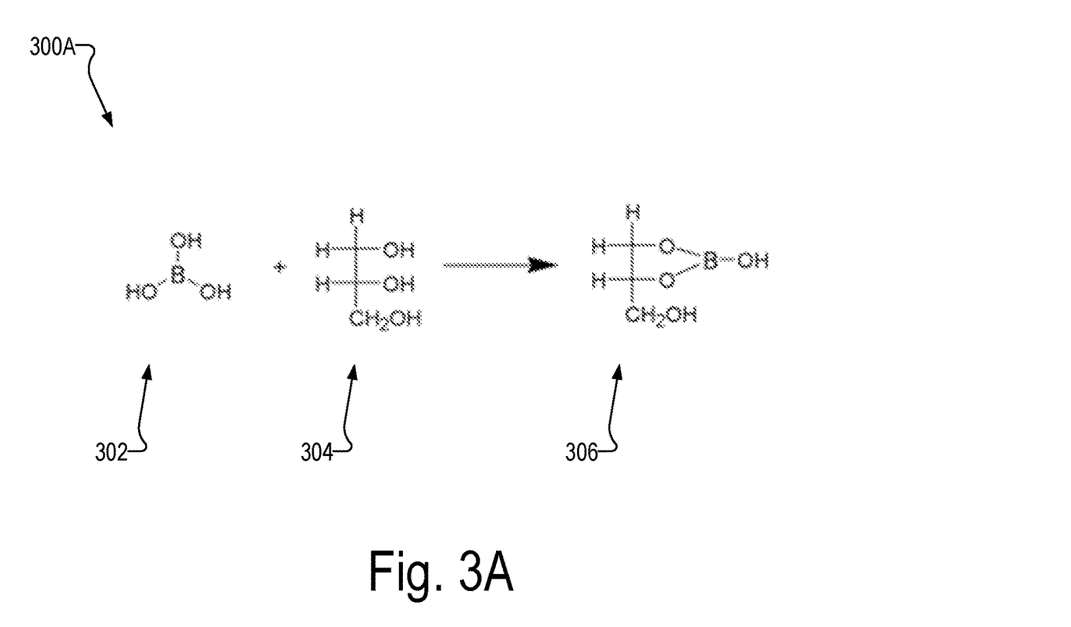
FIG. 3A shows an illustrative reaction scheme for synthesizing a cyclic boric acid derivative.

FIG. 3A shows an illustrative reaction scheme 300A for synthesizing a cyclic boric acid derivative. As shown, boric acid 302 is combined with glycerol 304 to produce a cyclic boric acid derivative 306. Glycerol 304 is represented by formula (IIa) in which X, Y, and Z are each hydrogen (H) and W is a hydroxymethyl group ($CH_2OH$). While FIG. 3A shows that boric acid is reacted with glycerol 304, boric acid 302 may be reacted with any other suitable sugar (e.g., glucose, fructose, etc.), sugar alcohol (e.g., mannitol, sorbitol, etc.) or poly-hydroxy compound. Additionally or alternatively, a boric acid derivative may be used instead of boric acid 302.

Figure 3B:
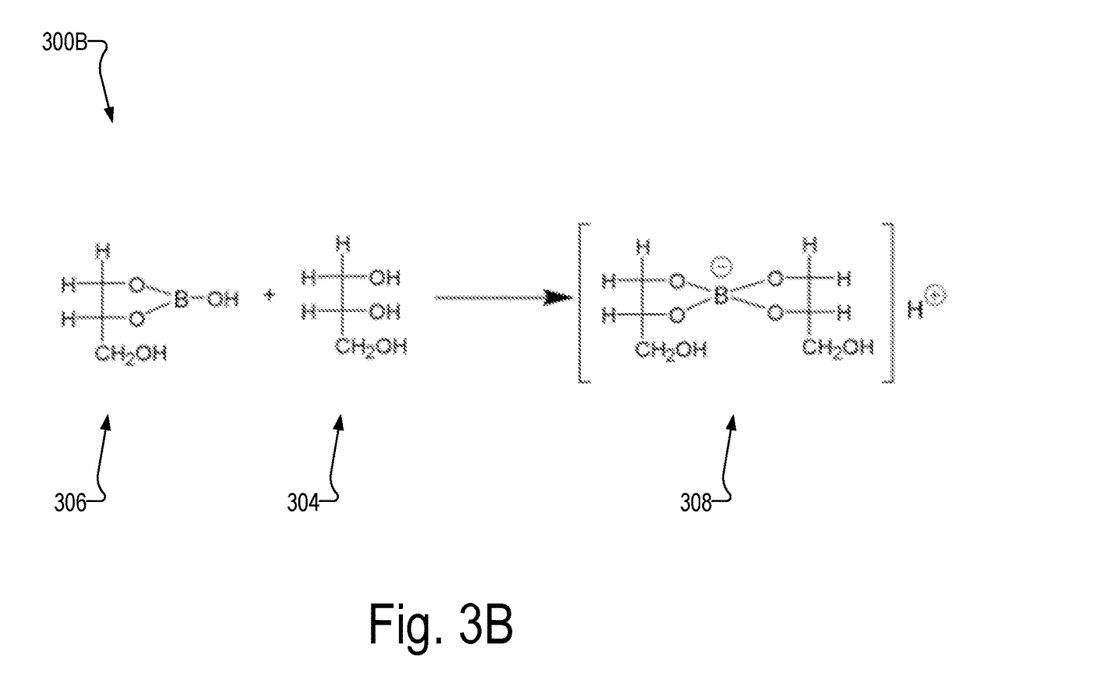
FIG. 3B shows an illustrative reaction scheme for synthesizing borospiranic acid.

FIG. 3B shows an illustrative reaction scheme 300B for synthesizing borospiranic acid, which is a tetravalent boric acid derivative. As shown, cyclic boric acid derivative 306 produced by reaction scheme 300A shown in FIG. 3A is combined with another glycerol molecule 304 to produce borospiranic acid 308. Although boric acid 302 is a weak acid, it forms strongly acidic borospiranic acid 308 in the presence of poly-hydroxy compounds such as sugar alcohols (e.g., glycerol 304). While FIG. 3B shows that cyclic boric acid derivative 306 is reacted with glycerol 304, cyclic boric acid derivative 306 may be reacted with any other suitable sugar, sugar alcohol (e.g., mannitol, sorbitol, etc.) or poly-hydroxy compound. Additionally or alternatively, cyclic boric acid derivative 306 may be replaced with any other suitable cyclic boric acid derivative.

The reaction schemes 300A and 300B illustrated in FIGS. 3A and 3B may be used to produce boron-based acid group 104 bonded to pore surface 202 (see FIG. 2A) and/or to produce boron-based acid group 104 bonded to pore surface 210 (see FIG. 2B). In some examples, a surface of a solid support material (e.g., pore surface 202 or particle surface 210) may be functionalized with a boric acid derivative or a poly-hydroxy compound. Illustrative reaction schemes for forming a boron-based acid group 104 bonded to a pore surface of porous structural framework 102 will now be shown and described with reference to FIGS. 4A to 9B. It will be recognized that these reaction schemes are merely illustrative and are not limiting.

Figure 4A:
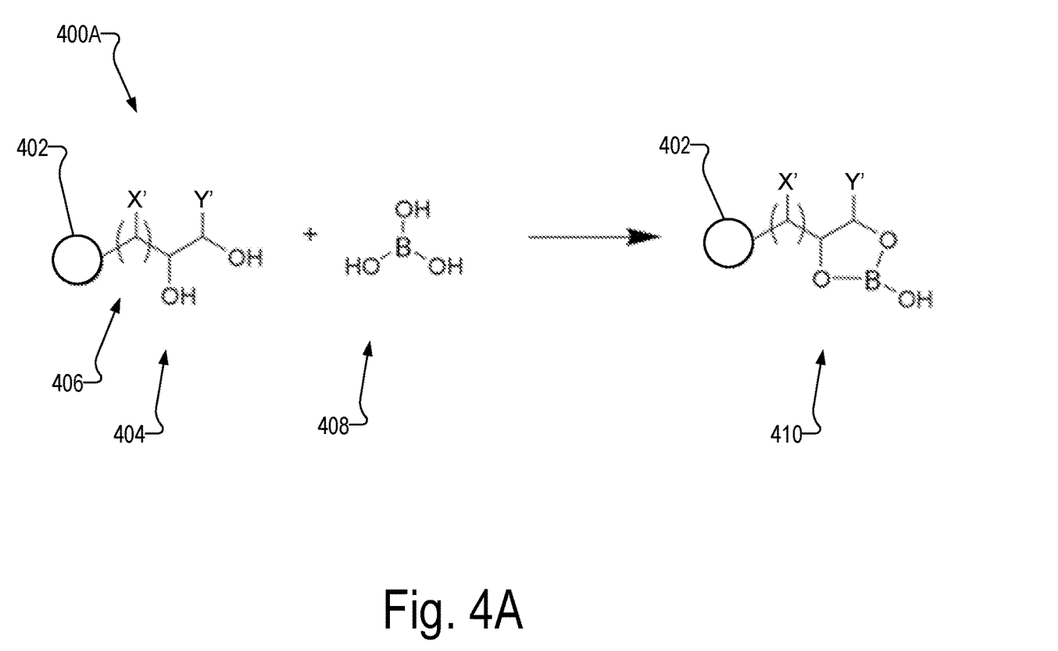
FIG. 4A shows an illustrative reaction scheme for synthesizing a solid support-bound single-ring cyclic boric acid derivative.

FIG. 4A shows an illustrative reaction scheme 400A for synthesizing a solid support-bound single-ring cyclic boric acid derivative. As shown, a solid support 402 is functionalized with a cis-1, 2-dihydroxy group 404 having cis-vicinal dihydroxy groups. Solid support 402 may be formed of any inorganic or organic solid support material for porous structural framework 102 described herein (e.g., glass, a ceramic, a synthetic polymer, a natural polymer), and may be selected for its mechanical strength, its durability in an environment with a high pH gradient, and/or for its affinity to water (e.g., it may be chosen to be hydrophilic or hydrophobic depending on the water-affinity balance desired for PEM 100). Solid support 402 may be a particle similar to solid support particles 206 described with reference to FIG. 2B. Alternatively, solid support 402 may be part of a porous structural framework 102 described with reference to FIG. 2A.

As shown in FIG. 4A, cis-1, 2-dihdroxy group 404 has a structure represented by formula (IIa) and includes a pendant moiety Y' and a linker chain 406 (represented by pendant group W or X in formula (IIa)) bonded to solid support 402. Linker chain 406 is a $C_1$ to $C_{30}$ alkyl chain and optionally has one or more pendant moieties X', which may be the same or different for each atom in linker chain 406. X' and Y' may each be independently selected from the group consisting of hydrogen (H), a hydroxyl group (OH), a fluoro group (F), a chloro group (Cl), a dialkylamino group (NR$_2$), a cyano group (CN), a carboxylic acid (COOH), a carboxylic amide, a carboxylic ester, an alkyl group, an alkoxy group, and an aryl group.

Cis-1, 2-dihdroxy group 404 is reacted with boric acid 408 to yield a single-ring cyclic boric acid derivative 410 bonded to solid support 402. With this configuration, solid support-bound cyclic boric acid derivative 410 may implement a boron-based acid group 104 bonded to a pore surface of porous structural framework 102 in PEM 100. Alternatively, solid support-bound cyclic boric acid derivative 410 may be further reacted with a poly-hydroxy compound to produce another boric acid derivative (e.g., borospiranic acid), as will now be described with reference to FIG. 4B.

Figure 4B:
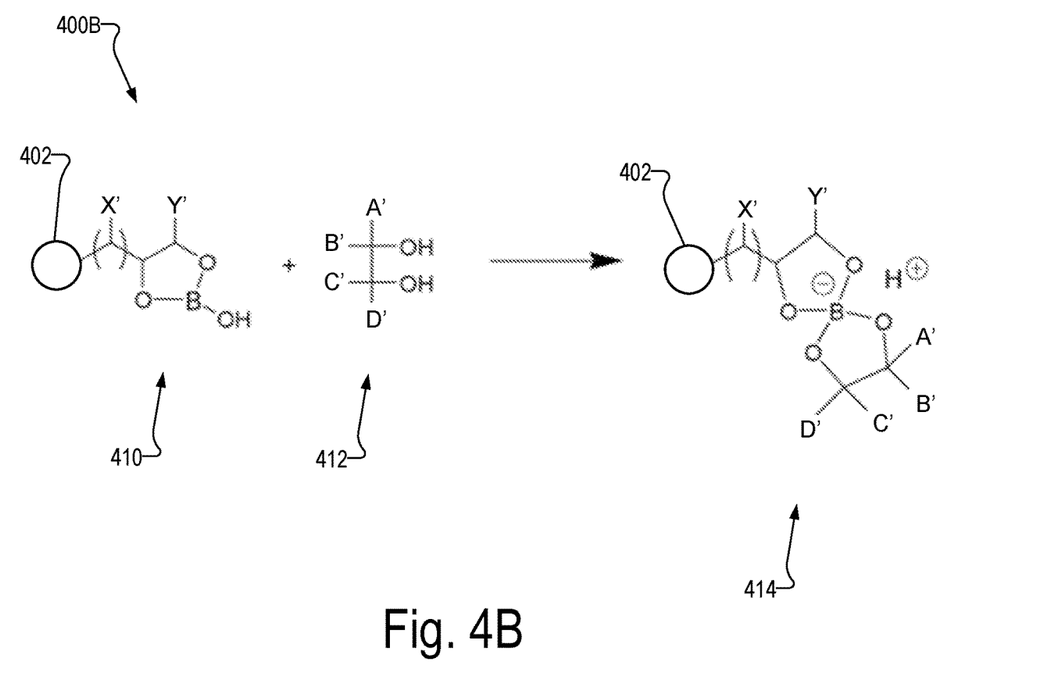
FIG. 4B shows an illustrative reaction scheme for synthesizing a solid support-bound borospiranic acid with pendant moieties.

FIG. 4B shows an illustrative reaction scheme 400B for synthesizing a solid support-bound borospiranic acid with pendant moieties. As shown, solid support-bound cyclic boric acid derivative 410 (produced by reaction scheme 400A shown in FIG. 4A) is combined with a poly-hydroxy compound 412 having pendant moieties A', B', C', and D'. Poly-hydroxy compound 412 has a structure represented by formula (IIa). Accordingly, pendant moieties A', B', C', and D' may correspond to pendant moieties W, X, Y, and Z described above with reference to formula (IIa).

Solid support-bound cyclic boric acid derivative 410 and poly-hydroxy compound 412 react to produce a solid support-bound borospiranic acid 414 with pendant moieties A', B', C', and D'. With this configuration, solid support-bound borospiranic acid 414 may implement a tetravalent boron-based acid group 104 bonded to a pore surface of porous structural framework 102 in PEM 100. The solid support-bound borospiranic acid 414 may show strong proton exchange properties depending on the electronic nature of the A', B', C', D', X' and Y' substitutions.

In examples in which solid support 402 comprises a porous polymer network, solid support-bound cyclic boric acid derivative 410 and solid support-bound borospiranic acid 414, with controlled loading of boric acid and borospiranic acid, respectively, may also be used to form an ionomer for catalyst binding in catalyst layers in a membrane electrode assembly, which is described below with reference to FIGS. 10 and 11.

Figure 5A:
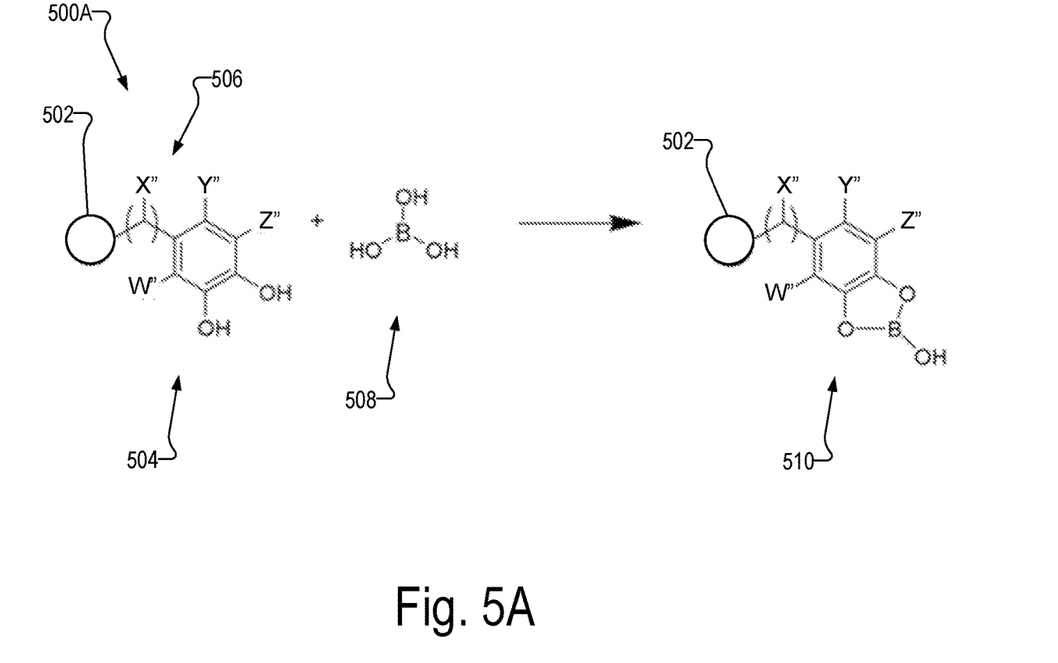
FIG. 5A shows an illustrative reaction scheme for synthesizing a solid support-bound cyclic boric acid derivative incorporating a catechol derivative.

FIG. 5A shows an illustrative reaction scheme 500A for synthesizing a solid support-bound cyclic boric acid derivative incorporating a catechol derivative. Reaction scheme 500A is similar to reaction scheme 400A except that in reaction scheme 500A the poly-hydroxy compound includes a catechol derivative.

In reaction scheme 500A, a solid support 502 is functionalized with a catechol derivative 504. Solid support 502 may be the same as or similar to solid support 402. Catechol derivative 504 has a structure represented by formula (IIb) and includes pendant moieties W", Y", and Z" and a linker chain 506 (represented by pendant group X in formula (IIb)) bonded to solid support 502. Linker chain 506 is a C$_1$ to C$_{30}$ alkyl chain and optionally has one or more pendant moieties X", which may be the same or different for each atom in linker chain 506. Pendant moieties W", X", Y", and Z" may each be independently selected from the group consisting of hydrogen (H), a hydroxyl group (OH), a fluoro group (F), a chloro group (Cl), a dialkylamino group (NR$_2$), a cyano group (CN), a carboxylic acid (COOH), a carboxylic amide, a carboxylic ester, an alkyl group, an alkoxy group, and an aryl group.

Catechol derivative 504 is reacted with boric acid 508 to produce a solid support-bound cyclic boric acid derivative 510 incorporating a catechol derivative. When solid support 502 is a polymer, a catechol structure may be introduced during polymerization (e.g., to form a catechol-formaldehyde resin), such as is described below with reference to FIG. 6. Alternatively, the catechol structure may be introduced post-polymerization (e.g., by functional modification of a Merrifield type resin).

With this configuration, solid support-bound cyclic boric acid derivative 510 incorporating a catechol derivative may implement a boron-based acid group 104 bonded to a pore surface of porous structural framework 102 in PEM 100. Alternatively, solid support-bound cyclic boric acid derivative 510 incorporating a catechol derivative may be further reacted with a poly-hydroxy compound to produce another boric acid derivative (e.g., a borospiranic acid derivative), as will now be described with reference to FIG. 5B.

Figure 5B:
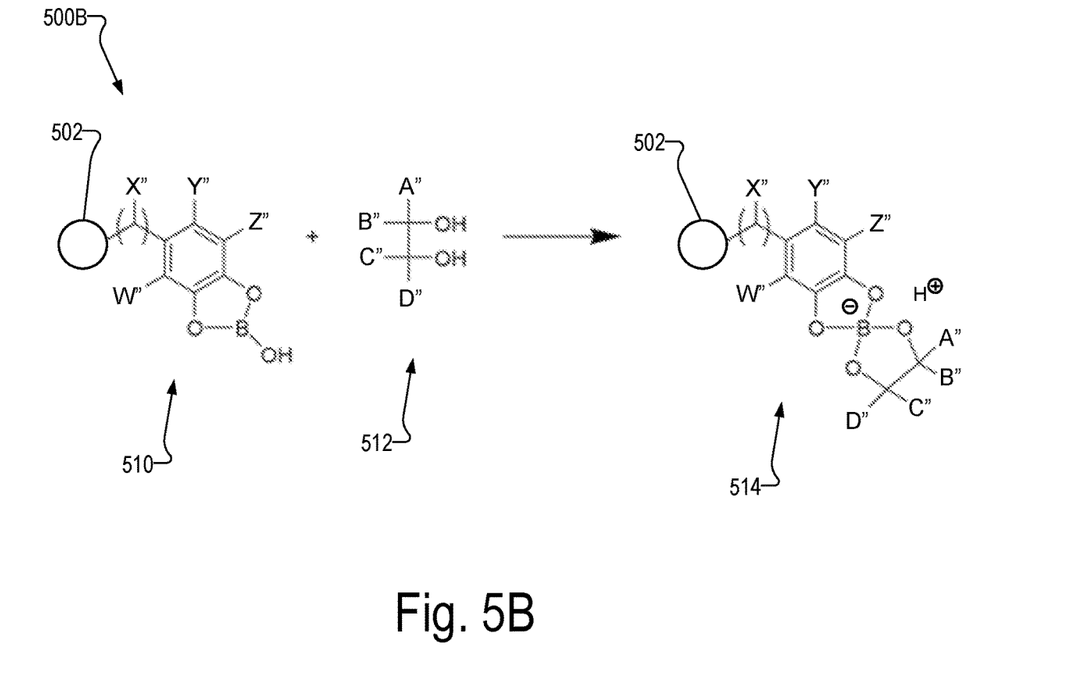
FIG. 5B shows an illustrative reaction scheme for synthesizing a solid support-bound borospiranic acid incorporating a catechol derivative and pendant moieties.

FIG. 5B shows an illustrative reaction scheme 500B for synthesizing a solid support-bound borospiranic acid derivative incorporating a catechol derivative and pendant moieties. In reaction scheme 500B, solid support-bound cyclic boric acid derivative 510 incorporating a catechol derivative is combined with a poly-hydroxy compound 512 with pendant moieties A", B", C", and D". Poly-hydroxy compound 512 has a structure represented by formula (IIa). Accordingly, pendant moieties A", B", C", and D" may correspond to pendant moieties W, X, Y, and Z described above with reference to formula (IIa).

Solid support-bound cyclic boric acid derivative 510 incorporating a catechol derivative combines with poly-hydroxy compound 512 to produce a solid support-bound borospiranic acid 514 incorporating a catechol derivative and including pendant moieties A", B", C", and D". With this configuration, solid support-bound borospiranic acid 514 incorporating a catechol derivative and including pendant moieties may implement a tetravalent boron-based acid group 104 bonded to a pore surface of porous structural framework 102 in PEM 100.

Figure 6:
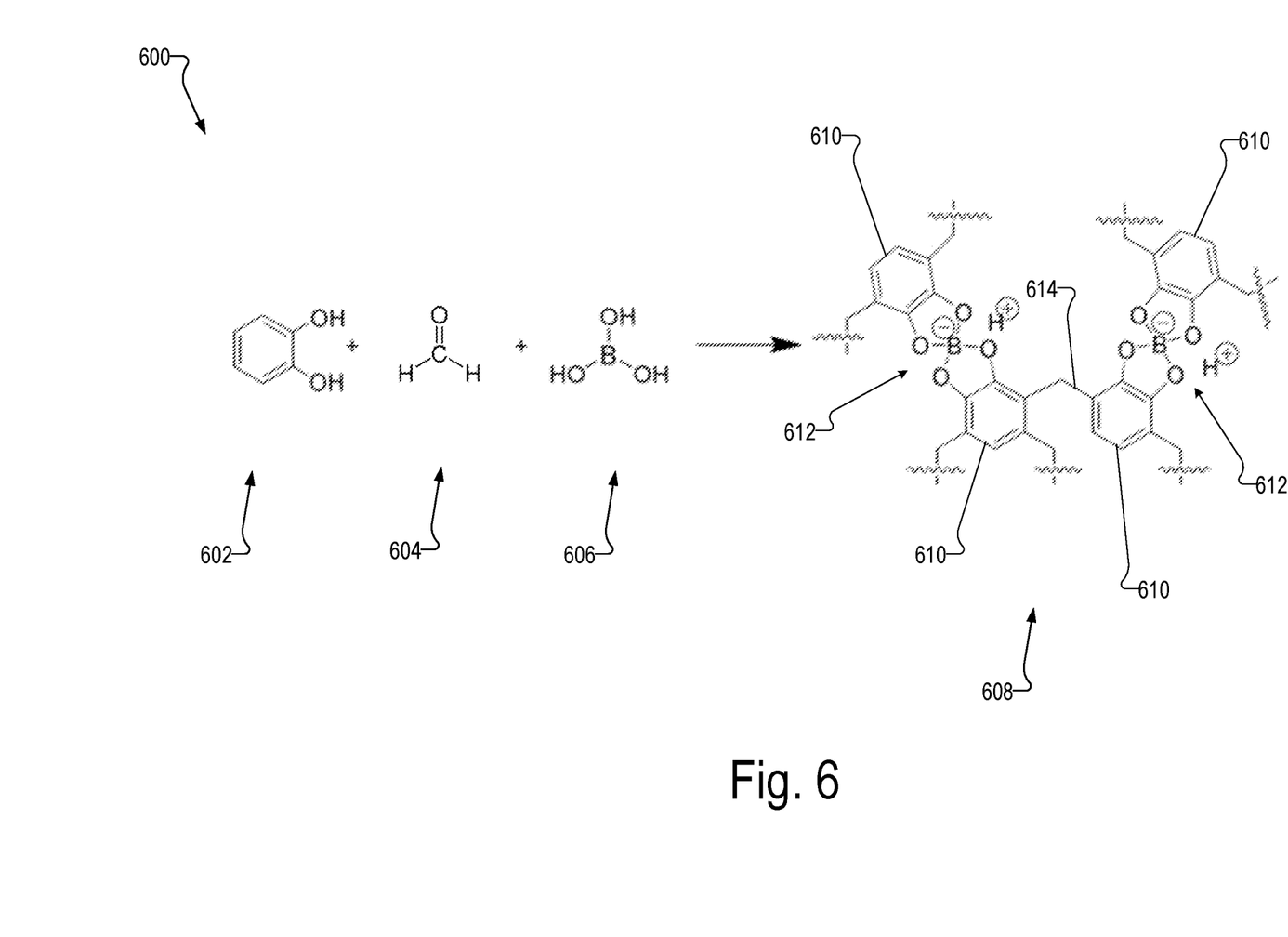
FIG. 6 shows an illustrative reaction scheme 600 for synthesizing a cross-linked copolymer containing boron-based acid groups.

FIG. 6 shows an illustrative reaction scheme 600 for synthesizing a cross-linked copolymer containing tetravalent boron-based acid groups. In reaction scheme 600, catechol 602, formaldehyde 604, and boric acid 606 are combined and polymerize to yield a catechol-formaldehyde-boric acid cross-linked copolymer 608 ("copolymer 608"). Copolymer 608 includes catechol structures 610 linked by borospiranic acid groups 612. Individual polymers of copolymer 608 are cross-linked by a cross-link 614 between catechol structures 610. Copolymer 608 may also contain other phenolic monomers, such as phenol, resorcinol, and trihydroxy phenols.

Copolymer 608 is suitable for PEM and ionomer applications. For example, the configuration of PEM 100 shown in FIG. 2B may be implemented by copolymer 608 in which borospiranic acid groups 612 (corresponding to boron-based acid groups 104) are bonded to and link catechol structures 610 (corresponding to solid support particles 206) to thereby form a porous structural framework 102. The mol % content of borospiranic acid groups 612 may be controlled for optimal functional performance as PEM 100 or as an ionomer for catalyst for catalyst binding in catalyst layers in a MEA, which is described below with reference to FIGS. 10 and 11.

As mentioned previously, in some examples a pore surface (e.g., pore surface 202) within porous structural framework 102 is functionalized with a boron-based acid group 104 (see FIG. 2A). FIGS. 7 to 9A show illustrative reaction schemes for functionalizing a pore surface of a porous structural framework with a boron-based acid group. These reaction schemes are compatible with solid support materials presenting one or more hydroxyl groups at the pore surface. Examples of such materials include, without limitation, silica, glass, alumina, clays, synthetic polymers, and cellulose.

Figure 7:
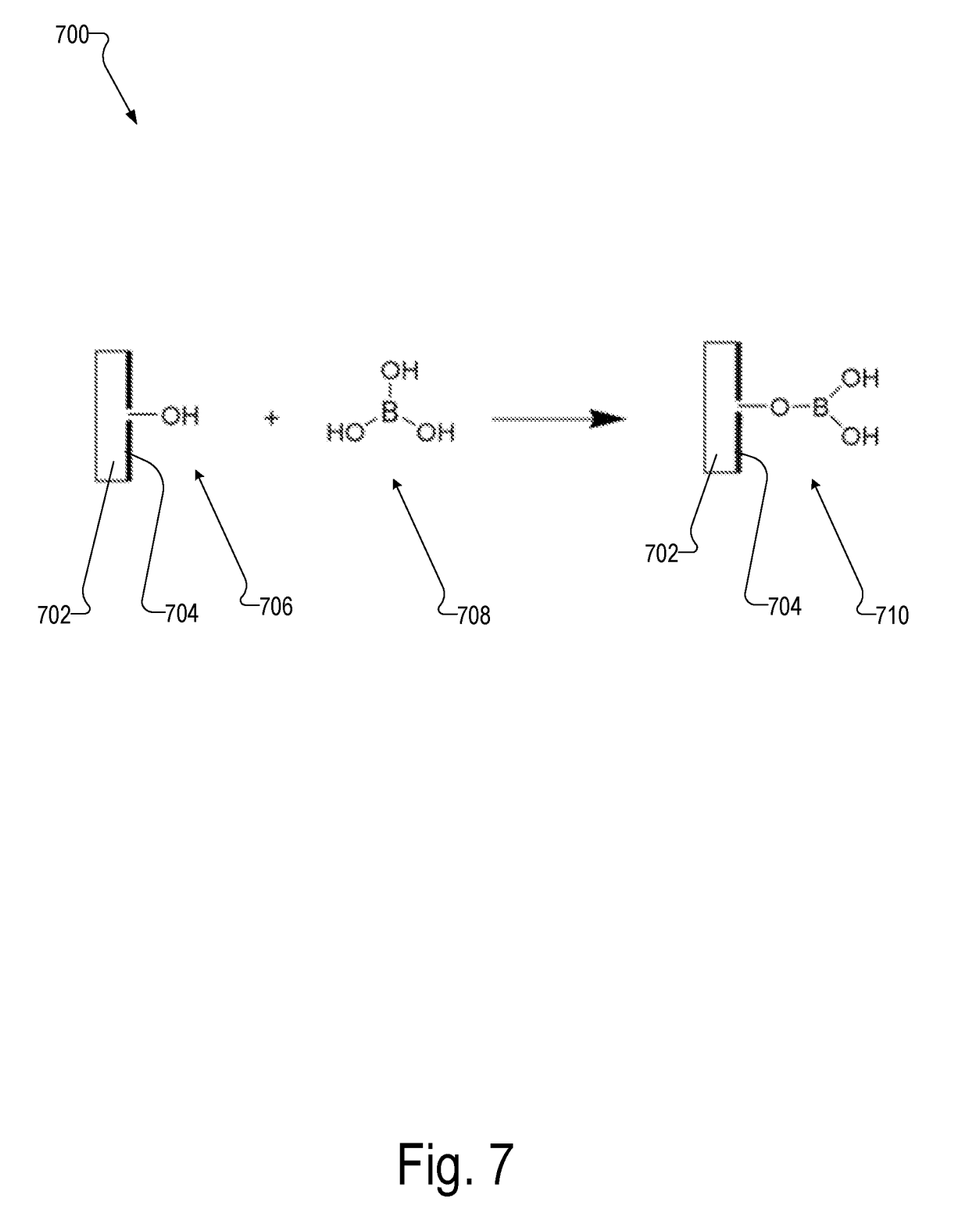
FIG. 7 shows an illustrative reaction scheme for functionalizing a pore surface of a porous structural framework with a boric acid derivative.

FIG. 7 shows an illustrative reaction scheme 700 for functionalizing a pore surface with a boron-based acid group. As shown in FIG. 7, a solid support 702 includes a surface 704 and a hydroxyl group 706 at surface 704. Surface 704 of solid support 702 may be a pore surface of porous structural framework 102 (e.g., surface 202 shown in FIG. 2A), or a surface of a solid support particle (e.g., a surface 210 of a solid support particle 206 shown in FIG. 2B). While FIG. 7 shows that surface 704 has only one hydroxyl group 706, surface 704 may have any other quantity and concentration of hydroxyl groups 706. In reaction scheme 700, surface 704 of solid support 702 is exposed to boric acid 708, which reacts with hydroxyl group 706 to form a boric acid derivative 710 bonded to surface 704. Solid support-bound boric acid derivative 710 may implement a boron-based acid group 104 bonded to a pore surface of porous structural framework 102 in PEM 100. Alternatively, solid support-bound boric acid derivative 710 may be further reacted with boric acid, another boric acid derivative, or a poly-hydroxy compound to produce another boric acid derivative.

Figure 8A:
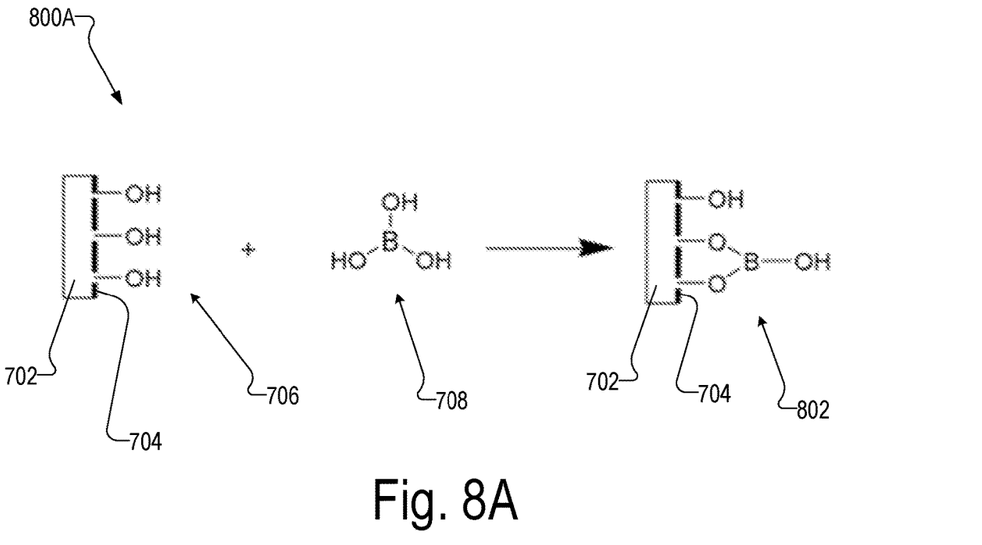
FIG. 8A shows another illustrative reaction scheme for functionalizing a pore surface of a porous structural framework with a boric acid derivative.

FIG. 8A shows another illustrative reaction scheme 800A for functionalizing a pore surface of a porous structural framework with a boron-based acid group. Reaction scheme 800A is similar to reaction scheme 700 except that boric acid 708 reacts with two hydroxyl groups 706 at surface 704 to produce a cyclic boric acid derivative 802. In some examples, surface 704 may be pre-activated to increase the surface density of hydroxyl groups 706. Any suitable pre-activation process may be used. Cyclic boric acid derivative 802 may implement a boron-based acid group 104 bonded to a pore surface of porous structural framework 102 in PEM. Alternatively, cyclic boric acid derivative 802 may be further reacted to produce another boric acid derivative, as will now be described with reference to FIG. 8B.

Figure 8B:
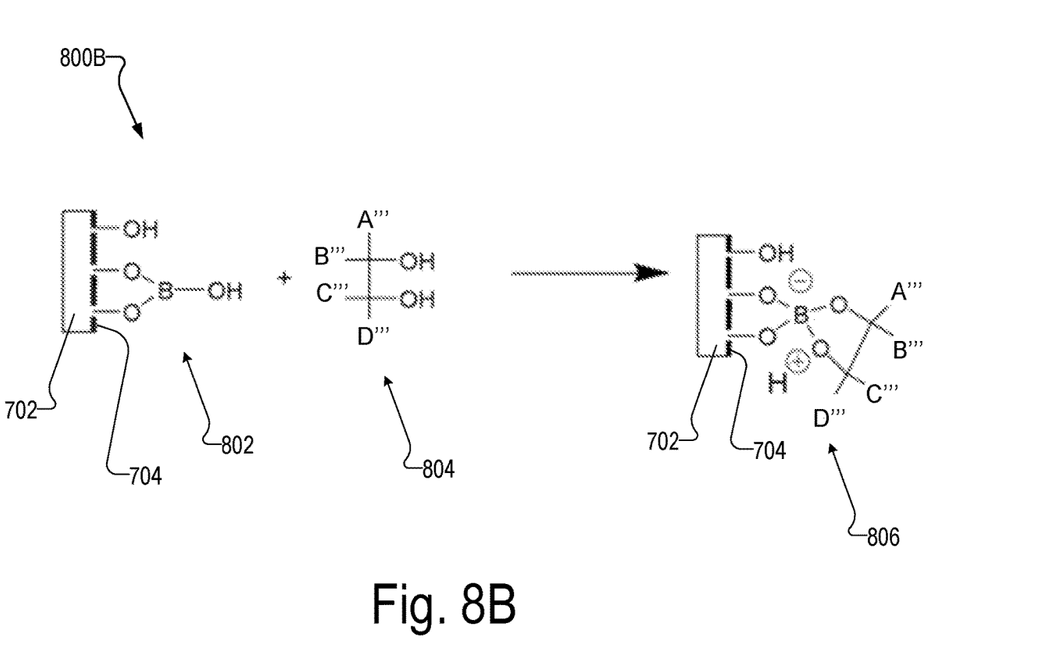
FIG. 8B shows another illustrative reaction scheme for functionalizing a pore surface of porous structural framework with a boric acid derivative (borospiranic acid).

FIG. 8B shows another illustrative reaction scheme 800B for functionalizing a pore surface of a porous structural framework with a tetravalent boric acid derivative (e.g., a borospiranic acid group). In reaction scheme 800B, cyclic boric acid derivative 802 produced in reaction scheme 800A shown in FIG. 8A is combined with a poly-hydroxy compound 804 having pendant moieties A''', B''', C''', and D'''. Poly-hydroxy compound 804 has a structure represented by formula (IIa). Accordingly, pendant moieties A''', B''', C''', and D''' may correspond to pendant moieties W, X, Y, and Z described above with reference to formula (IIa). Cyclic boric acid derivative 802 and poly-hydroxy compound 804 react to produce borospiranic acid with pendant moieties 806, which is bonded to pore surface 704. Solid support-bound borospiranic acid with pendant moieties 806 may implement a tetravalent boron-based acid group 104 bonded to a pore surface of porous structural framework 102 in PEM 100.

Figure 9A:
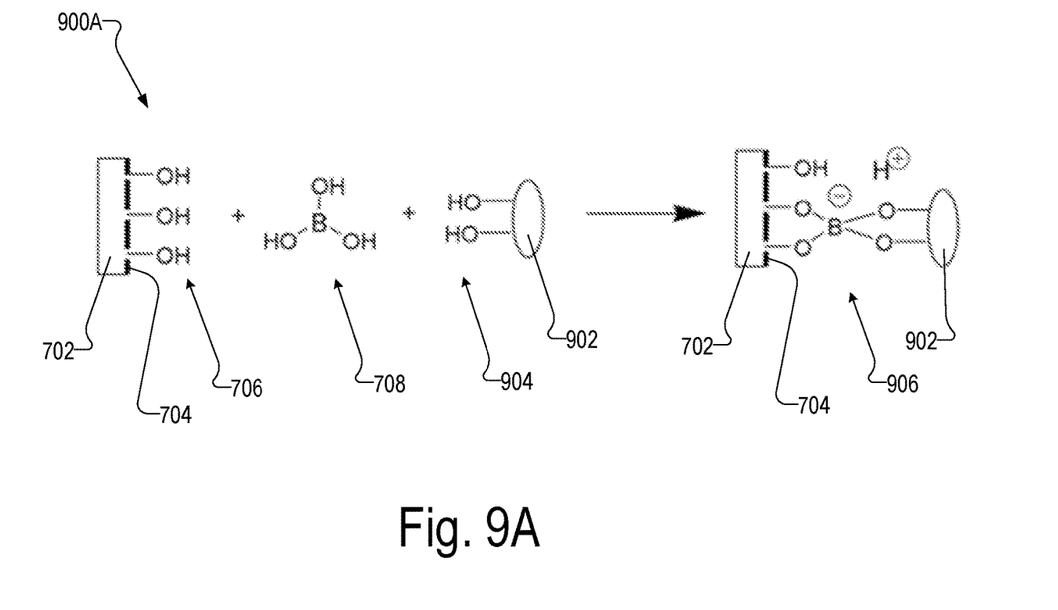
FIG. 9A shows an illustrative reaction scheme for coupling a particle (e.g., a nanoparticle) to a pore surface of a porous structural framework via a boric acid derivative (e.g., borospiranic acid).

FIG. 9A shows an illustrative reaction scheme 900A for coupling a particle (e.g., a nanoparticle or a microparticle) to a pore surface of a porous structural framework via a tetravalent boric acid derivative (e.g., borospiranic acid). The porosity of PEM 100 may be controlled and defined by the size of particle 902. Particle 902 may also be selected for its mechanical strength, its durability in an environment with a high pH gradient, and/or for its affinity to water (e.g., it may be chosen to be hydrophilic or hydrophobic depending on the water-affinity balance desired for PEM 100).

Scheme 900A is similar to scheme 800A except that a particle 902 presenting hydroxyl groups 904 is combined with boric acid 708. As a result, hydroxyl groups 706 on pore surface 704 are cross-linked to hydroxyl groups 904 on the surface of particle 902 using boric acid 708. This cross-coupling reaction results in linking particle 902 to pore surface 704 via borospiranic acid 906. Particle 902 may be formed of any suitable material (e.g., silica, glass, alumina, ceramics, clays, synthetic polymers, cellulose), and may be the same or different from the material of solid support 702.

Reaction scheme 900A may be controlled to proceed in any order. In some examples, a first step of reaction scheme 900A includes performing reaction scheme 800A to produce solid support-bound cyclic boric acid derivative 802. In a second step, particle 902 may be exposed to solid support-bound cyclic boric acid derivative 802 to produce solid support-bound borospiranic acid 906. Alternatively, particle 902 may be combined with boric acid 708 in a first step to produce an intermediate boric acid derivative. In a second step, hydroxyl groups 706 on surface 704 of solid support 702 are exposed to the intermediate boric acid derivative, which react to produce solid support-bound borospiranic acid 906 and link particle 902 to solid support 702. In yet further examples, reaction scheme 900A may be performed by combining all reactants in a single step.

Figure 9B:
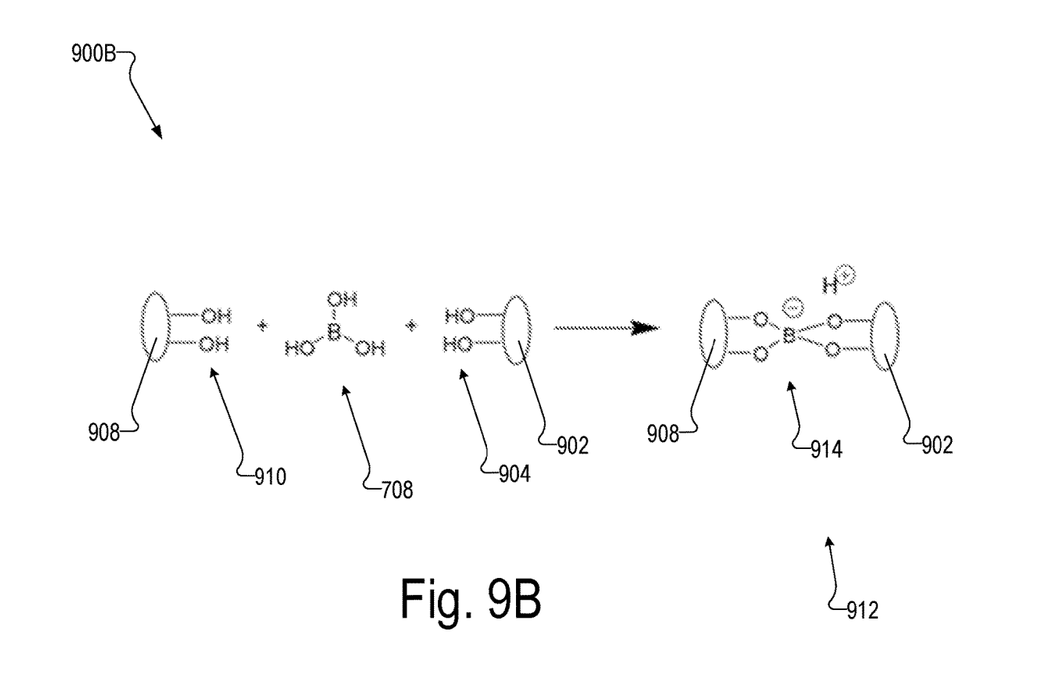
FIG. 9B shows an illustrative reaction scheme for cross-linking multiple particles including multiple sheets within a polymer structure using a boric acid derivative.

FIG. 9B shows an illustrative reaction scheme 900B for cross-linking multiple particles including multiple sheets within a polymer structure using a tetravalent boric acid derivative. Reaction scheme 900B is similar to reaction scheme 900A except that in reaction scheme 900B particle 902 (a first particle 902) is cross-linked with a second particle 908 presenting two hydroxyl groups 910 (instead of with hydroxyl groups 706 on pore surface 704). First particle 902 and second particle 908 may each be a microparticle or a nanoparticle and may have any size as may suit a particular implementation (e.g., may range in size from a few nanometers to several hundreds of microns). Reaction scheme 900B produces linked particles 912 with a borospiranic group 914. First particle 902 and second particle 908 may be made of the same material or using different materials, which may be selected from any solid support material described herein (e.g., silica, glass, alumina, ceramics, clays, synthetic polymers, cellulose, etc.).

Reaction scheme 900B may be used to produce PEM 100, effectively using the second configuration 200B shown in FIG. 2B. The porosity of PEM 100 may be defined by the size of first particle 902 and second particle 908.

The boron-containing porous membranes described herein may be used in water electrolysis and/or fuel cell applications. Illustrative applications will now be described with reference to FIGS. 10 and 11.

Figure 10:
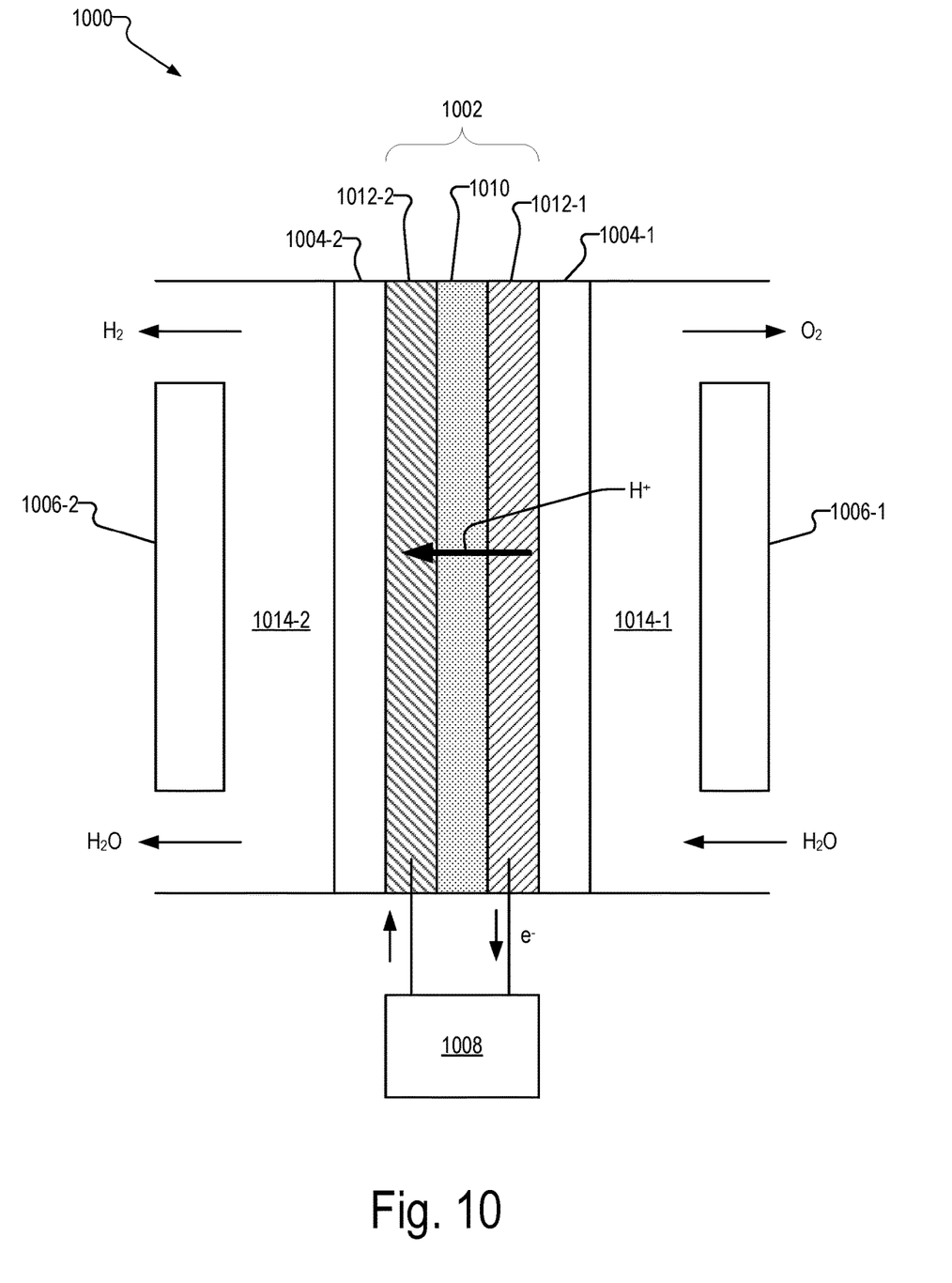
FIG. 10 shows an illustrative proton exchange membrane water electrolysis system incorporating a boron-containing porous membrane.

FIG. 10 shows an illustrative proton exchange membrane water electrolysis system 1000 (PEM water electrolysis system 1000) incorporating a boron-containing porous membrane. PEM water electrolysis system 1000 uses electricity to split water into oxygen ($O_2$) and hydrogen ($H_2$) via an electrochemical reaction. The configuration of PEM water electrolysis system 1000 is merely illustrative and not limiting, as other suitable configurations as well as other suitable water electrolysis systems may incorporate a boron-containing porous membrane.

As shown in FIG. 10, PEM water electrolysis system 1000 includes a membrane electrode assembly 1002 (MEA 1002), porous transport layers 1004-1 and 1004-2, bipolar plates 1006-1 and 1006-2, and an electrical power supply 1008. PEM water electrolysis system 1000 may also include additional or alternative components not shown in FIG. 10 as may serve a particular implementation.

MEA 1002 includes a PEM 1010 positioned between a first catalyst layer 1012-1 and a second catalyst layer 1012-2. PEM 1010 electrically isolates first catalyst layer 1012-1 from second catalyst layer 1012-2 while providing selective conductivity of cations, such as protons (H$^+$), and while being impermeable to gases such as hydrogen and oxygen. PEM 1010 may be implemented by any suitable PEM. For example, PEM 1010 may be implemented by a boron-containing porous membrane (e.g., PEM 100) comprising a porous structural framework with boron-based acid groups bonded to pore surfaces within the porous structural framework.

First catalyst layer 1012-1 and second catalyst layer 1012-2 are electrically conductive electrodes with embedded electrochemical catalysts (not shown), such as platinum, ruthenium, and/or or cerium(IV) oxide. In some examples, first catalyst layer 1012-1 and second catalyst layer 1012-2 are formed using an ionomer to bind catalyst nanoparticles. As mentioned previously, the ionomer used to form first catalyst layer 1012-1 and second catalyst layer 1012-2 may include a boron-based acid group as described herein, such as copolymer 608 (see FIG. 6).

MEA 1002 is placed between porous transport layers 1004-1 and 1004-2, which are in turn placed between bipolar plates 1006-1 and 1006-2 with flow channels 1014-1 and 1014-2 located in between bipolar plates 1006 and porous transport layers 1004.

In MEA 1002, first catalyst layer 1012-1 functions as an anode and second catalyst layer 1012-2 functions as a cathode. When PEM water electrolysis system 1000 is powered by power supply 1008, an oxygen evolution reaction (OER) occurs at anode 1012-1, represented by the following electrochemical half-reaction:

$$2H_2O \rightarrow O_2 + 4H^+ + 4e^-$$

Protons are conducted from anode 1012-1 to cathode 1012-2 through PEM 1010, and electrons are conducted from anode 1012-1 to cathode 1012-2 by a conductive path around PEM 1010. PEM 1010 allows for the transport of protons (H$^+$) and water from the anode 1012-1 to the cathode 1012-2 but is impermeable to oxygen and hydrogen. At cathode 1012-2, the protons combine with the electrons in a hydrogen evolution reaction (HER), represented by the following electrochemical half-reaction:

$$4H^+ + 4e^- \rightarrow 2H_2$$

The OER and HER are two complementary electrochemical reactions for splitting water by electrolysis, represented by the following overall water electrolysis reaction:

$$2H_2O \rightarrow 2H_2 + O_2$$

Figure 11:
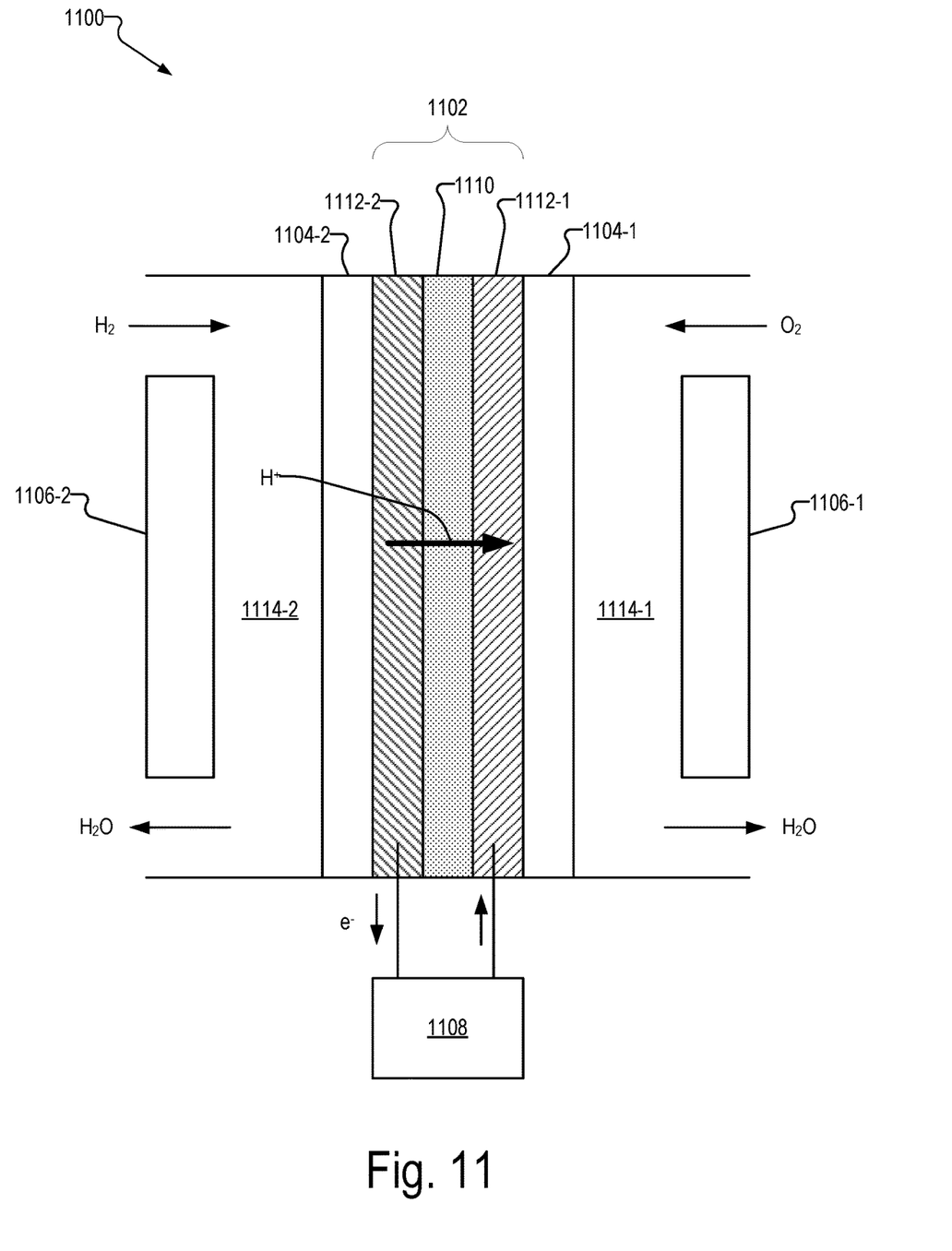
FIG. 11 shows an illustrative proton exchange membrane fuel cell incorporating a boron-containing porous membrane.

FIG. 11 shows an illustrative proton exchange membrane fuel cell 1100 (PEM fuel cell 1100) including a boron-containing porous membrane. PEM fuel cell 1100 produces electricity as a result of electrochemical reactions. In this example, the electrochemical reactions involve reacting hydrogen gas (H$_2$) and oxygen gas (O$_2$) to produce water and electricity. The configuration of PEM fuel cell 1100 is merely illustrative and not limiting, as other suitable configurations as well as other suitable proton exchange membrane fuel cells may incorporate a boron-containing porous membrane.

As shown in FIG. 11, PEM fuel cell 1100 includes a membrane electrode assembly 1102 (MEA 1102), porous transport layers 1104-1 and 1104-2, bipolar plates 1106-1 and 1106-2. An electrical load 1108 may be electrically connected to MEA 1102 and driven by PEM fuel cell 1100. PEM fuel cell 1100 may also include additional or alternative components not shown in FIG. 11 as may serve a particular implementation.

MEA 1102 includes a PEM 1110 positioned between a first catalyst layer 1112-1 and a second catalyst layer 1112-2. PEM 1110 electrically isolates first catalyst layer 1112-1 from second catalyst layer 1112-2 while providing selective conductivity of cations, such as protons (H$^+$), and while being impermeable to gases such as hydrogen and oxygen. PEM 1110 may be implemented by any suitable PEM. For example, PEM 1110 may be implemented by a boron-containing porous membrane (e.g., PEM 100) comprising a porous structural framework with boron-based acid groups bonded to pore surfaces within the porous structural framework.

First catalyst layer 1112-1 and second catalyst layer 1112-2 are electrically conductive electrodes with embedded electrochemical catalysts (not shown). In some examples, first catalyst layer 1112-1 and second catalyst layer 1112-2 are formed using an ionomer to bind catalyst nanoparticles. In some examples, the ionomer used to form first catalyst layer 1112-1 and second catalyst layer 1104-2 includes an ionomer incorporating a boric acid derivative as described herein, such as copolymer 608 (see FIG. 6).

MEA 1102 is placed between porous transport layers 1104-1 and 1104-2, which are in turn placed between bipolar plates 1106-1 and 1106-2 with flow channels 1114 located in between. In MEA 1102, first catalyst layer 1112-1 functions as a cathode and second catalyst layer 1112-2 functions as an anode. Cathode 1112-1 and anode 1112-2 are electrically connected to load 1108, and electricity generated by PEM fuel cell 1100 drives load 1108.

During operation of PEM fuel cell 1100, hydrogen gas (H$_2$) flows into the anode side of PEM fuel cell 1100 and oxygen gas (O$_2$) flows into the cathode side of PEM fuel cell 1100. At anode 1112-2, hydrogen molecules are catalytically split into protons (H$^+$) and electrons (e$^-$) according to the following hydrogen oxidation reaction (HOR):

$$2H_2 \rightarrow 4H^+ + 4e^-$$

The protons are conducted from anode 1112-2 to cathode 1112-1 through PEM 1100, and the electrons are conducted from anode 1112-2 to cathode 1112-1 around PEM 1110 through a conductive path and load 1108. At cathode 1112-1, the protons and electrons combine with the oxygen gas according to the following oxygen reduction reaction (ORR):

$$O_2 + 4H^+ + 4e^- \rightarrow 2H_2O$$

Thus, the overall electrochemical reaction for the PEM fuel cell 1100 is:

$$2H_2 + O_2 \rightarrow 2H_2O$$

In the overall reaction, PEM fuel cell 1100 produces water at cathode 1112-1. Water may flow from cathode 1112-1 to anode 1112-2 through PEM 1110 and may be removed through outlets at the cathode side and/or anode side of PEM fuel cell 1100. The overall reaction generates electrons at the anode that drive load 1108.

The boron-containing porous membranes described herein (e.g., PEM 100) may also be used as a pathogen-neutralizing porous membrane. For example, porous structural framework 102 may have pores that are small enough to prevent the passage of pathogens such as bacteria, fungal spores, and viruses. The boron-based acid groups 104 may also have antipathogenic activity against bacteria, fungi, and viruses, including SARS-CoV-2. For example, the basic protein sites of pathogens, including SARS-CoV-2, may ionically bond with the acidic boron sites of the proton exchange membranes, thereby preventing passage of the pathogens through the proton exchange membranes. As a result, the proton exchange membranes may be implemented in face masks, surgical masks, and air filters and air purification systems for enclosed spaces (e.g., homes, offices, hospitals, factories, vehicles, airplanes, etc.).

In the preceding description, various illustrative embodiments have been described with reference to the accompanying drawings. It will, however, be evident that various modifications and changes may be made thereto, and additional embodiments may be implemented, without departing from the scope of the claims that follow. For example, certain features of one embodiment described herein may be combined with or substituted for features of another embodiment described herein. The description and drawings are accordingly to be regarded in an illustrative rather than a restrictive sense.

In the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A proton exchange membrane comprising:

a porous structural framework; and a tetravalent boron-based acid group bonded to the porous structural framework.

2. The proton exchange membrane of claim 1, wherein the tetravalent boron-based acid group comprises a cyclic boric acid derivative.

3. The proton exchange membrane of claim 1, wherein the tetravalent boron-based acid group comprises borospiranic acid.

4. The proton exchange membrane of claim 1, wherein the tetravalent boron-based acid group comprises a catechol derivative.

5. The proton exchange membrane of claim 1, wherein the porous structural framework comprises solid support particles linked by the tetravalent boron-based acid group.

6. The proton exchange membrane of claim 1, wherein:

the porous structural framework comprises a porous polymer network, and the tetravalent boron-based acid group is bonded to pore surfaces of the porous polymer network.

7. The proton exchange membrane of claim 1, wherein the porous structural framework comprises an inorganic material.

8. A method of making a proton exchange membrane, comprising:

functionalizing a pore surface included in a porous structural framework with a tetravalent boron-based acid group.

9. The method of claim 8, wherein the tetravalent boron-based acid group comprises a cyclic boric acid derivative.

10. The method of claim 8, wherein the tetravalent boron-based acid group comprises borospiranic acid.

11. The method of claim 8, wherein the tetravalent boron-based acid group comprises a catechol derivative.

12. The method of claim 8, wherein the functionalizing comprises reacting boric acid or a boric acid derivative with hydroxyl groups present at the pore surface.

13. The method of claim 8, wherein the functionalizing comprises reacting a poly-hydroxy compound with a boric acid derivative bonded to the pore surface.

14. The method of claim 8, further comprising coupling a nanoparticle to the pore surface by way of the tetravalent boron-based acid group.

15. A membrane electrode assembly, comprising:

a cathode;

an anode; and a proton exchange membrane positioned between the cathode and the anode, the proton exchange membrane comprising a porous structural framework and tetravalent boron-based acid groups bonded to pore surfaces in the porous structural framework.

16. The membrane electrode assembly of claim 15, wherein the tetravalent boron-based acid groups comprise a cyclic boric acid derivative.

17. The membrane electrode assembly of claim 15, wherein the tetravalent boron-based acid groups comprise borospiranic acid.

18. The membrane electrode assembly of claim 15, wherein the tetravalent boron-based acid groups comprise a catechol derivative.

19. The membrane electrode assembly of claim 15, wherein the porous structural framework comprises an inorganic material.

20. The membrane electrode assembly of claim 15, wherein:

at least one of the anode or the cathode comprises a catalyst and an ionomer for binding the catalyst; and the ionomer comprises a tetravalent boron-based acid group.

* * * * *